S. NORO.
ATTACHMENT FOR HORSESHOES.
APPLICATION FILED NOV. 20, 1915.

1,194,773.

Patented Aug. 15, 1916.

Inventor:
Seikichi Noro,
by A. V. Groupy
Attorney

UNITED STATES PATENT OFFICE.

SEIKICHI NORO, OF PHILADELPHIA, PENNSYLVANIA.

ATTACHMENT FOR HORSESHOES.

1,194,773. Specification of Letters Patent. Patented Aug. 15, 1916.

Application filed November 20, 1915. Serial No. 62,464.

*To all whom it may concern:*

Be it known that I, SEIKICHI NORO, a subject of the Emperor of Japan, residing at Philadelphia, in the county of Philadelphia and State of Pennsylvania, have invented certain new and useful Improvements in Attachments for Horseshoes, of which the following is a specification.

The object of my invention is to provide a novel, inexpensive, simple and efficient anti-slipping attachment for horseshoes which may be readily applied to and removed from a horseshoe, and which, when applied, will be firmly held in place without liability of working loose.

With this object in view my invention consists of the elements and the combinations of them hereinafter fully described and claimed.

Figure 1:
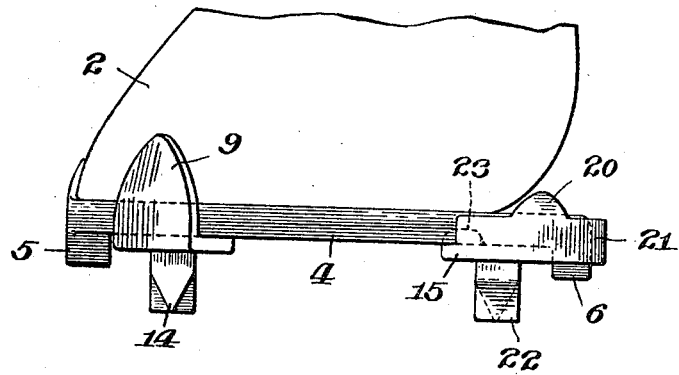
Figure 2:
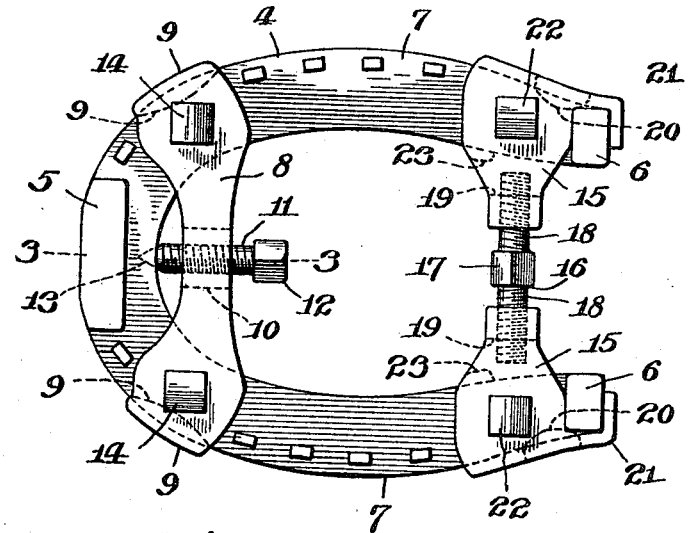
Figure 3:
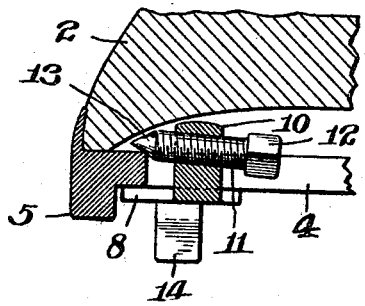

In the accompanying drawings, illustrating my invention: Figure 1 is a side elevation of the lower portion of a horse's hoof having a horseshoe thereon and my improved attachment applied to the horseshoe. Fig. 2 is a bottom view of the parts shown in Fig. 1. Fig. 3 is a vertical section, on line 3—3 of Fig. 2.

Referring to the drawings, 2 designates a horse's hoof and 4 a horeshoe secured thereto and provided with the forward calk 5 extending downwardly from the forward portion of the shoe, and the rearward calks 6 extending downwardly from the rearward ends of the side portions 7 of the horseshoe.

Extending across the forward portion of the horeshoe 4 beneath the same and back of the calk 5 is a horizontal plate 8 which is engaged with the bottom of the horseshoe and which has upwardly and inwardly extending parts 9 on the respective ends thereof. The parts 9 engage the outer face of the forward portion of the horseshoe 4 and the upper end portions of the parts 9 extend inwardly over the horseshoe to prevent downward displacement of the plate 8. The central portion of the plate 8 is provided with a lug 10 which extends upwardly therefrom within the horseshoe 4; and screwed into and through the lug 10 is a screw 11 having a suitable square head 12 on the rearward end thereof by means of which it may be turned. The forward end portion 13 of the screw 11 is tapered, as shown, and extends over and engages the top of the horseshoe 4 between the same and the hoof 2 and clamps the horseshoe 4 between the tapered portion 13 of the screw 11 and the plate 8 when the screw 11 is screwed hard against the horseshoe 4. The screw 11 not only clamps the horseshoe 4, as just described, but it also clamps the same between the screw 11 and the parts 9, for the reason that the tapered portion 13 of the screw, engaging the top corner of the horseshoe forces the plate 8 upwardly and also forces the plate 8 and parts 9 thereof rearwardly. The end portions of the plate 8 are provided with suitable downwardly-projecting, anti-slipping calks 14, as shown. By manipulating the screw 11, the plate 8 and parts carried thereby may be readily secured to or removed from the horseshoe 4.

Extending across the rearward portion of the horseshoe are two members 15 and a connecting element 16 which comprises a square head 17 and two oppositely screw-threaded shanks 18 extending from the respective sides of the head 17 and screwed into upwardly extending lugs 19 which are formed on the inner ends of the pair of members 15. By turning the element 16 in one direction the members 15 may be drawn toward each other, and by turning the element 16 in the reverse direction the two members 15 may be forced apart. The members 15 are engaged with the bottoms of the side portions 7 of the horseshoe 4 adjacent to the calks 6; and the outer ends of the members 15 are provided with upwardly and inwardly extending parts 20 which engage the outer faces of the side portions 7 of the horseshoe 4 and are bent to extend inwardly over the top of the same to prevent downward displacement of the members 15. The members 15 are also provided with rearwardly-extending parts 21 which embrace the calks 6, as shown, and prevent forward displacement of the members 15; and the members 15 are also provided with upwardly extending parts 23 which are adapted to engage the inner faces of the side portions 7 of the horseshoe and prevent rearward displacement of the members 15 when the horseshoe is not provided with the calks 6. It will be readily understood that by turning the element 16 to draw the members 15 toward each other they will be firmly clamped to the horseshoe 4; and that by turning the element 16 to separate the members 15 they and the parts connected thereto may be readily removed from the horseshoe 4. The members 15 are provided with suitable downwardly-projecting, anti-slipping calks 22, as shown.

I claim:

1. In an attachment for horseshoes, a plate adapted to engage the bottom of a horseshoe and having an upwardly extending part adapted to engage the outer face of a horseshoe, and means adjustably connected to said plate and adapted to engage the top of a horseshoe and to exert a downward pressure thereon and clamp the same between said plate and said means.

2. In an attachment for horseshoes, a plate adapted to engage the bottom of the horseshoe and having an upwardly extending part adapted to engage the outer face of a horseshoe and having an upwardly extending lug adapted to be located within a horseshoe, and an adjustable screw carried by said lug and adapted to engage the top of a horseshoe and clamp the same between said plate and said screw.

3. In an attachment for horseshoes, a plate adapted to engage the bottom of a horseshoe and having an upwardly extending part adapted to engage the outer face of a horseshoe and having an upwardly extending lug adapted to be located within a horseshoe, and an adjustable screw carried by said lug and having a tapered portion adapted to engage the top of a horseshoe and clamp the same between said plate and said tapered portion.

In testimony whereof I affix my signature hereto.

SEIKICHI NORO.

Copies of this patent may be obtained for five cents each, by addressing the "Commissioner of Patents, Washington, D. C."